United States Patent
Fabian et al.

(10) Patent No.: US 11,060,563 B2
(45) Date of Patent: Jul. 13, 2021

(54) SHAFT-HUB CONNECTION

(71) Applicant: Bayerische Motoren Werke Aktiengesellschaft, Munich (DE)

(72) Inventors: Karsten Fabian, Oberschleissheim (DE); Torsten Landgraf, Aying (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 360 days.

(21) Appl. No.: 16/115,053

(22) Filed: Aug. 28, 2018

(65) Prior Publication Data
US 2018/0363710 A1    Dec. 20, 2018

Related U.S. Application Data

(63) Continuation of application No. PCT/EP2017/053724, filed on Feb. 20, 2017.

(30) Foreign Application Priority Data

Feb. 29, 2016 (DE) ..................... 10 2016 203 188.0

(51) Int. Cl.
*F16D 1/108* (2006.01)
*F16D 1/10* (2006.01)

(52) U.S. Cl.
CPC ........ *F16D 1/108* (2013.01); *F16D 2001/103* (2013.01)

(58) Field of Classification Search
CPC .... F16C 2226/12; F16C 2226/80; F16D 1/06; F16D 1/072; F16D 1/108;
(Continued)

(56) References Cited

U.S. PATENT DOCUMENTS 2,317,070 A * 4/1943 Le Tourneau .......... F16D 1/092
                                                              403/255
3,531,144 A * 9/1970 Bizilia ................ B25B 23/0035
                                                              403/359.5
(Continued)

FOREIGN PATENT DOCUMENTS

CA              972989 A  *  8/1975  .............. F16D 1/116
CN         101641528 A       2/2010
(Continued)

OTHER PUBLICATIONS

International Search Report (PCT/ISA/210) issued in PCT Application No. PCT/EP2017/053724 dated May 11, 2017 with English translation (five pages).
(Continued)

*Primary Examiner* — Josh Skroupa
(74) *Attorney, Agent, or Firm* — Crowell & Moring LLP

(57) ABSTRACT

A shaft-hub connection includes a shaft, which is provided with an external toothing arrangement in a connecting region. The shaft-hub connection also includes a hub, which is provided with an internal toothing arrangement in a connecting region. The external toothing arrangement has a first tip diameter (K1) on the side facing the axial end of the shaft and a second, larger tip diameter (K2) on the side of the connecting region facing away from the axial end so that together with the internal toothing arrangement of the hub a clearance fit is created in the region of the first tip diameter (K1) and an interference fit is created in the region of the second tip diameter (K2).

9 Claims, 2 Drawing Sheets

(58) Field of Classification Search
CPC ......... F16D 2001/103; Y10T 403/1624; Y10T 403/7026; Y10T 403/7033; Y10T 403/7035
USPC .......................... 403/14, 359.1, 359.5, 359.6
See application file for complete search history.

(56) References Cited

U.S. PATENT DOCUMENTS

| | | | | |
|---|---|---|---|---|
| 3,608,936 | A * | 9/1971 | Karden | F16D 1/108 403/359.5 |
| 3,622,185 | A * | 11/1971 | Rosan, Sr. | F16D 1/06 403/316 |
| 5,716,156 | A * | 2/1998 | Bayer | F16D 1/072 403/359.6 |
| 7,073,797 | B2 * | 7/2006 | Gaul | B23B 31/1107 403/359.5 |
| 7,387,462 | B2 * | 6/2008 | Hacker | F16D 1/072 403/359.6 |
| 8,020,299 | B2 * | 9/2011 | Shirokoshi | F16D 1/072 29/893.2 |
| 8,757,887 | B2 * | 6/2014 | Torii | F16D 1/072 403/359.1 |
| 8,870,489 | B2 * | 10/2014 | Langer | F16D 1/108 403/359.5 |
| 9,353,690 | B2 * | 5/2016 | Makulec | F16C 3/02 |
| 9,435,381 | B2 * | 9/2016 | Larson | F16D 1/072 |
| 9,903,365 | B2 * | 2/2018 | Isoda | F04C 15/0057 |
| 10,619,677 | B2 * | 4/2020 | Soennichsen | F04C 15/0065 |
| 2010/0003075 | A1 | 1/2010 | Lang et al. | |
| 2010/0119301 | A1 | 5/2010 | Langer et al. | |
| 2012/0281941 | A1 | 11/2012 | Umekida et al. | |
| 2015/0323014 | A1 | 11/2015 | Clark et al. | |
| 2016/0186852 | A1 | 6/2016 | Ogiwara | |
| 2017/0209943 | A1 | 7/2017 | Reichenberger et al. | |

FOREIGN PATENT DOCUMENTS

| | | | |
|---|---|---|---|
| CN | 102666129 A | 9/2012 | |
| DE | 19523584 A1 * | 1/1997 | ............... F16D 1/06 |
| DE | 10 2005 035 706 A1 | 2/2007 | |
| DE | 10 2015 122 515 A1 | 6/2016 | |
| EP | 1 900 951 A1 | 3/2008 | |
| EP | 2 977 132 A1 | 1/2016 | |
| WO | WO 2008/148373 A1 | 12/2008 | |

OTHER PUBLICATIONS

German-language Written Opinion (PCT/ISA/237) issued in PCT Application No. PCT/EP2017/053724 dated May 11, 2017 (five pages).

German-language Search Report issued in counterpart German Application No. 10 2016 203 188.0 dated Oct. 20, 2016 with partial English translation (nine pages).

Chinese-language Office Action issued in Chinese Application No. 201780006299.3 dated Apr. 21, 2020 with English translation (14 pages).

* cited by examiner

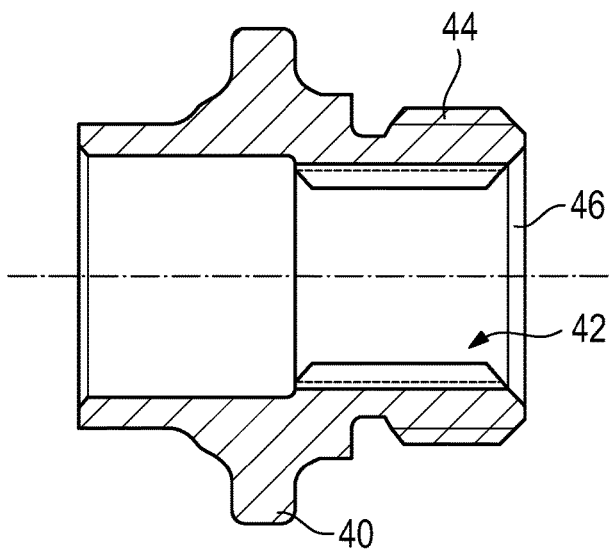 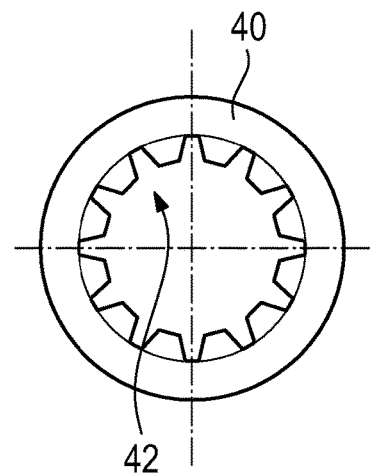
Fig. 2  Fig. 3
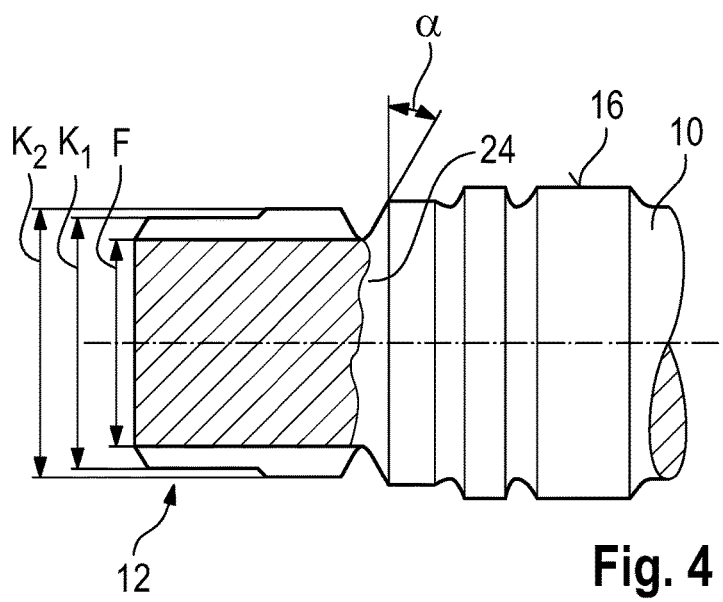 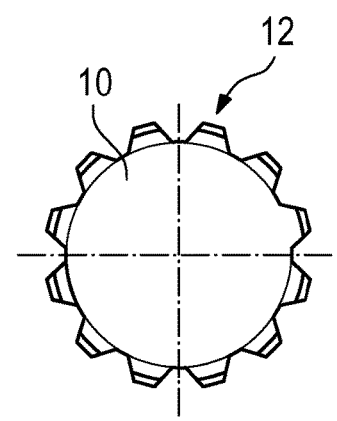
Fig. 4  Fig. 5

SHAFT-HUB CONNECTION

CROSS REFERENCE TO RELATED APPLICATIONS

This application is a continuation of PCT International Application No. PCT/EP2017/053724, filed Feb. 20, 2017, which claims priority under 35 U.S.C. § 119 from German Patent Application No. 10 2016 203 188.0, filed Feb. 29, 2016, the entire disclosures of which are herein expressly incorporated by reference.

BACKGROUND AND SUMMARY OF THE INVENTION

The embodiments of the invention relate to a shaft-hub connection with a shaft, which is provided with an external toothing arrangement in a connecting region, and a hub, which is provided with an internal toothing arrangement in a connecting region. The embodiments of the invention also relate to a method for producing a shaft-hub connection.

Shaft-hub connections are used where torque has to be reliably transmitted between the shaft and the hub. By using the internal and the external toothing arrangements in the connecting region a form-fitting engagement between shaft and hub is created so that unlike in the case of an interference fit the maximum torque which can be transmitted does not depend on parameters such as surface condition of the abutting surfaces or the temperature.

External and internal toothing arrangements can be used for the purpose of centering the shaft and the hub relative to each other. If the toothing arrangements are designed with suitable geometry and suitable dimensions, for example an interference fit can be achieved between the shaft and the hub, as a result of which the position of the two parts relative to each other is very accurately established. As a result of this, concentricity deviations can be reduced or even avoided. However, such a shaft-hub connection can be comparatively difficult to assemble.

One of the objects of the invention entails creating a shaft-hub connection which on the one hand ensures good centering of the shaft relative to the hub and on the other hand can be easily assembled.

For achieving this and other objects, it is provided in the case of a shaft-hub connection of the type referred to in the introduction that the external toothing arrangement has a first tip diameter on the side facing the axial end of the shaft and a second, larger tip diameter on the side of the connecting region facing away from the axial end so that together with the internal toothing arrangement of the hub a clearance fit is created in the region of the first tip diameter and an interference fit is created in the region of the second tip diameter. The embodiments of the invention are based on the fundamental idea of dividing the connecting region of the shaft into two sections so that the first section can be used for pre-assembly and in the process can especially be joined manually. The second section serves for the centering of the shaft relative to the hub, higher joining forces being necessary in this region. Since the two components, however, have already been pre-assembled with each other via the first section of the connecting region, these forces can be applied more easily.

The difference between the first and the second tip diameters is preferably less than 50 µm and preferably less than 20 µm. Especially preferably, the difference between the first and the second tip diameters is in the order of magnitude of 10 µm. The first tip diameter is in this case even reduced to such an extent that the shaft and the hub can be assembled with low axial forces, but the connecting region continues to support the shaft inside the hub as soon as the shaft and the hub are aligned with each other in a slightly inclined manner. As a result of this, tilting of the hub on the shaft is prevented. Depending on the respective requirements, however, other differences between the tip diameters can also be applied.

It is provided that the external and the internal toothing arrangements are designed as involute toothing arrangements. An involute toothing arrangement can be rolled onto the shaft with comparatively little effort.

It is preferably provided that a nut, which interacts with a thread on the hub, is arranged on the shaft. The nut enables the axial forces to be applied with little effort, which axial forces are required for inserting the connecting region with the second tip diameter into the hub. In the process, the nut can very easily be brought into engagement with the thread on the hub since the shaft and the hub have already been pre-assembled; the section of the connecting region—which has the first tip diameter—inserted into the hub, already ensures a sufficiently accurate positioning of shaft and hub relative to each other.

The axial length of the engagement between nut and hub preferably corresponds approximately to the length of the connecting region which has the second tip diameter. With these dimensions, the connecting region with the first tip diameter can be completely inserted into the shaft before the nut is screwed onto the thread of the hub.

The hub and/or the shaft preferably have/has an axial stop. The axial stop defines the position of the shaft relative to the hub in the completely assembled state.

The axial stop may be designed as a cone. As a result of this, additional centering is achieved.

For achieving the aforementioned objects, provision herein is also provided a method for producing a shaft-hub connection by means of the following steps: provision is made for a shaft with at least one bearing section and with an external toothing arrangement on an axial end. The shaft is hardened, and the bearing section and a section of the external toothing facing the axial end of the shaft are turned in one chucking operation so that the external toothing arrangement has a section with a first tip diameter and a section with a second tip diameter. The shaft and a hub, with an internal toothing arrangement complementary to the external toothing arrangement, are joined, wherein in a first step the first section of the external toothing arrangement is joined to the hub in a basically force-free manner and in a second step the second section of the external toothing arrangement is pressed into the hub. The particular advantage of the method exists in the fact that as a result of the turning of the bearing section and the external toothing arrangement in one chucking operation very small tolerances of the machined sections relative to each other can be achieved. Due to the section of the connecting region which has a smaller diameter the shaft-hub connection can be pre-assembled in an almost force-free manner. With regard to the advantages which ensue in the process, reference is made to the above explanations.

The second section of the external toothing arrangement is preferably also turned in the same chucking operation. This ensures that positional tolerances of the bearing section of the shaft relative to the second section of the connecting region, which is essentially for the centering of the shaft relative to the hub, are prevented as far as possible.

The force required for the axial pressing is preferably applied by a nut, fixed axially on the shaft, being screwed onto the hub. In this way, the required axial force can be created in a very controlled manner.

Other objects, advantages and novel features of the embodiments of the present invention will become apparent from the following detailed description of one or more preferred embodiments when considered in conjunction with the accompanying drawings, in which:

BRIEF DESCRIPTION OF THE DRAWINGS

FIG. 2 schematically shows the hub used in the shaft-hub connection of FIG. 1.
FIG. 3 schematically shows an end face view of the connecting region of the hub of FIG. 2.
FIG. 4 shows the shaft used in the shaft-hub connection of FIG. 1, in a broken-off, partially sectioned side view.
FIG. 5 schematically shows an end face view of the connecting region of the shaft of FIG. 4.

DETAILED DESCRIPTION OF THE DRAWINGS

Figure 1:
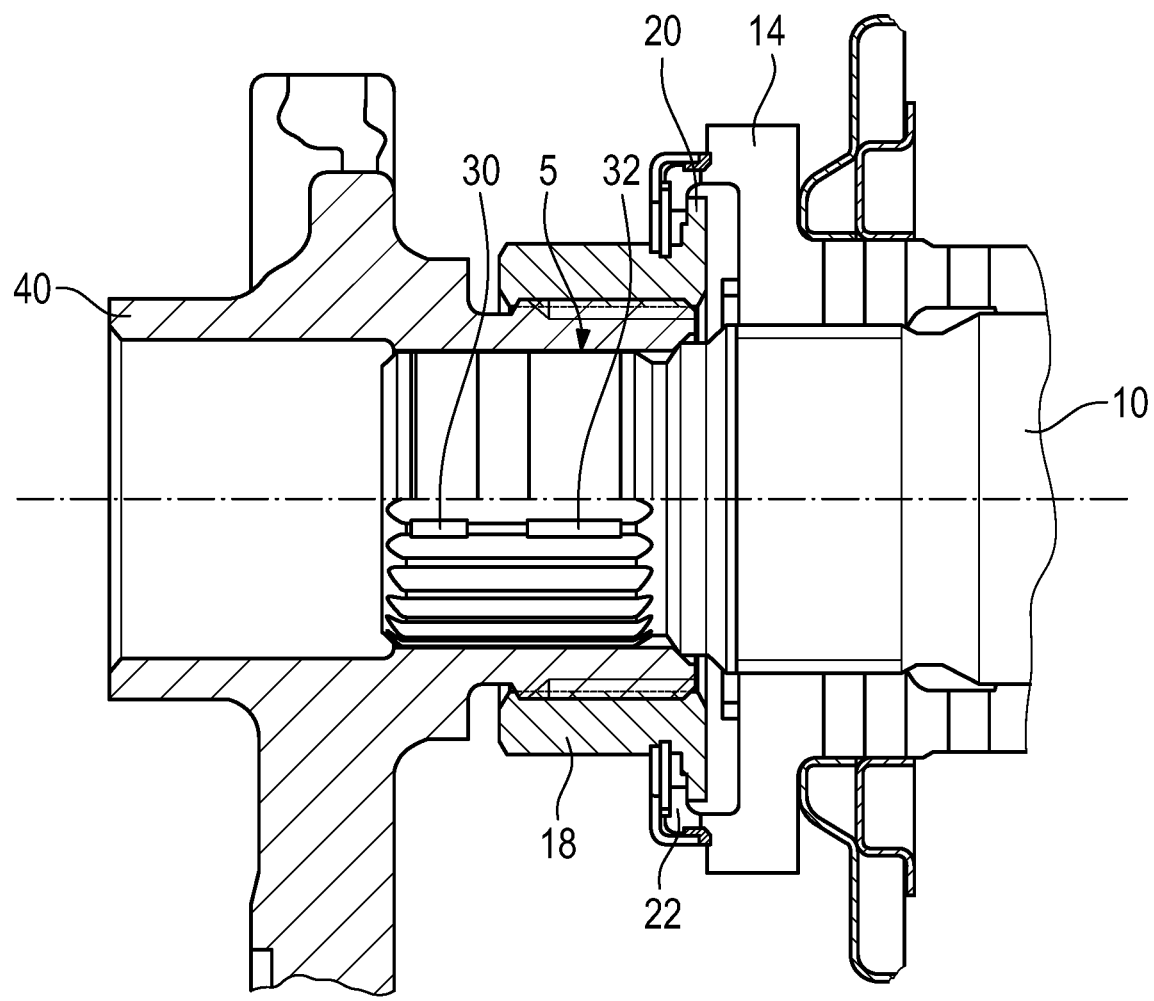
FIG. 1 shows a shaft-hub connection.

Shown in FIG. 1 is a shaft-hub connection 5 of a shaft 10 to a hub 40. In the case of the shaft, it can especially be the shaft of the differential bevel pinion of rear-axle transmission of a motor vehicle, and in the case of the hub 40 it can especially be the output-side end of a jointed shaft or cardan shaft.

The shaft-hub connection is formed in the depicted exemplary embodiment by an internal toothing arrangement 42 (see FIGS. 2 and 3), which is provided in the interior of the hub 40, and by an external toothing arrangement 12 which is provided on an axial end of the shaft 10 (see FIGS. 4 and 5). The toothing arrangements 12, 42 are designed in this case as involute toothing arrangements. Other tooth profiles are in principle also possible.

The external toothing arrangement 12 and the internal toothing arrangement 42 in each case define a connecting region on the shaft 10 or on the hub 40 in which these are coupled to each other in a form-fitting manner when the shaft-hub connection is produced (see FIG. 1).

The internal toothing arrangement 42 is produced in a broaching process so that it has a constant root diameter and a constant tip diameter over its entire axial length.

On the outer side of the hub 40, provision is made on its side facing the shaft 10 for a male thread 44, the function of which is explained later.

The external toothing arrangement 12 has a constant root diameter F over its entire axial length. However, the tip diameter of the external toothing arrangement 12 is not constant. On the side facing the axial end of the shaft 10, the external toothing arrangement 12 is designed with a first tip diameter $K_1$, whereas the external toothing arrangement 12 on a side adjoining thereto, facing away from the axial end, has a second tip diameter $K_2$. The second tip diameter $K_2$ is in this case slightly larger than the first tip diameter $K_1$. The diameter difference is shown greatly enlarged in FIG. 4. Actually, in practice a diameter difference in the order of magnitude of 10 μm is advantageous.

The external toothing arrangement 12 and the internal toothing arrangement 42 are adapted to each other in their dimensions so that the tip surface 30 (see FIG. 1) of the teeth of the external toothing arrangement 12 in the section with the smaller tip diameter $K_1$ forms a clearance fit with the root surface between the teeth of the internal toothing arrangement 42, whereas the tip surface (32) of the teeth of the external toothing arrangement 12 in the section with the larger tip diameter $K_2$ forms an interference fit with the root surfaces between the teeth of the internal toothing arrangement 42.

Arranged on the shaft 10, in the axial direction inside the external toothing arrangement 12, is a fastening element 14 which for example can be a nut. By means of the fastening element 14, for example a bearing race (not shown here) can be axially clamped on a bearing surface 16 of the shaft 10.

Attached on the fastening element 14 is a nut 18 which can be rotated relative to the fastening element 14 but is fixed on this in the axial direction. For this purpose, the nut 18 is provided with a flange 20 which projects in the axial direction and engages behind a shoulder 22 of the fastening element 14. The flange 20 can be of elliptical design for example so that if the nut 18 is slightly tilted it can be engaged behind the shoulder 22.

The axial length of the nut 18 lies approximately in the order of magnitude of the axial length of the section of the external toothing arrangement 12 which has the larger tip diameter $K_2$.

The external toothing arrangement 12 is produced on the shaft 10 preferably by means of hot rolling or cold rolling. The shaft 10 is then hardened. In a further machining step, the external toothing arrangement 12 is turned, that is to say machined-cut in a turning process. In the process, both the first tip diameter $K_1$ and the second tip diameter $K_2$ are created. In the same chucking operation, the bearing surface 16 is also turned. In this way, it is ensured that especially the section of the external toothing arrangement 12, which has the second tip diameter $K_2$, and the bearing surface 16 have no positional deviation at all or no other tolerances relative to each other, as could occur during machining with re-chucking between the individual machining steps.

Adjoining the external toothing arrangement 12 of the shaft 10, on the side facing away from the axial end, is an axial abutment surface 24 which is designed as a flat cone with a cone angle α in the order of magnitude of 30°. A complementary conical surface 46 on the hub 40 can interact with the conical surface 24.

In order to assemble the hub 40 on the shaft 10, the section of the external toothing arrangement 12 provided with the first tip diameter $K_1$ is inserted into the internal toothing arrangement 42. The first tip diameter $K_1$ is in this case dimensioned relative the internal toothing arrangement 42 so that a clearance fit exists. Correspondingly, the required joining forces are very low. In particular, the two components can be fitted into each other manually.

In the pre-assembled state, the nut 18 lies directly in front of the first turn of the thread 44. The engagement of the section of the external toothing arrangement 12 provided with the first tip diameter $K_1$ in the internal toothing arrangement 42 ensures that the shaft 10 and the hub 40 are concentric to such extent that the nut 18 can easily be screwed onto the thread 44 manually. The nut 18 can then be further rotated mechanically so that the hub 40 is also drawn onto the section of the external toothing arrangement 12 which has the second, larger tip section $K_2$.

The assembly process is completed as soon as the conical surfaces 24, 46 butt against each other in the axial direction.

The interference fit in the region of the section of the external toothing arrangement 12 which has the larger tip diameter $K_2$ ensures centering of the shaft 10 relative to the hub 40. If increased tilting forces should act upon the hub 40 relative to the shaft 10, the outer end of the section of the external toothing arrangement 12 designed with the smaller tip diameter $K_1$ comes to butt against the hub 40 since on account of the very small diameter difference between the two tip diameters $K_1$, $K_2$ a very small inclined position already suffices so that the first section of the external toothing arrangement 12 also undertakes a centering action.

Also conceivable in principle are constructions other than the nut 18, by means of which the required axial force for joining the shaft-hub connection can be applied.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A shaft-hub connection comprises:
    a shaft, which is provided with an external toothing arrangement in a connecting region; and
    a hub, which is provided with an internal toothing arrangement in a connecting region, wherein
        the external toothing arrangement has a first tip diameter (K1) on the side facing the axial end of the shaft and a second, larger tip diameter (K2) on the side of the connecting region facing away from the axial end so that together with the internal toothing arrangement of the hub a clearance fit is created in the region of the first tip diameter (K1) and an interference fit is created in the region of the second tip diameter (K2), and
        the difference between the first and the second tip diameters (K1, K2) is less than 50 μm.

2. The shaft-hub connection as claimed in claim 1, wherein the difference between the first and the second tip diameters (K1, K2) is in the order of 10 μm.

3. The shaft-hub connection as claimed in claim 2, wherein the external and the internal toothing arrangements are designed as involute toothing arrangements.

4. The shaft-hub connection as claimed in claim 3, wherein a nut, which interacts with a thread on the hub, is arranged on the shaft.

5. The shaft-hub connection as claimed in claim 4, wherein the axial length of the engagement between nut and hub corresponds approximately to the length of the connecting section which has the second tip diameter (K2).

6. The shaft-hub connection as claimed in claim 5, wherein the hub and/or the shaft have an axial stop, especially a flat cone.

7. A method for producing a shaft-hub connection, comprising the acts of:
    providing a shaft with at least one bearing surface and with an external toothing arrangement on an axial end;
    hardening the shaft;
    turning, the bearing surface and a section of the external toothing arrangement facing the axial end of the shaft, in one chucking operation so that the external toothing arrangement has a section with a first tip diameter (K1) and a section with a second tip diameter (K2); and
    joining the shaft and a hub with an internal toothing arrangement complementary to the external toothing arrangement, wherein
        the first section of the external toothing arrangement is joined to the hub in a force-free manner and subsequently pressing the second section of the external toothing arrangement into the hub, and
        the difference between the first and the second tip diameters (K1, K2) is less than 50 μm.

8. The method as claimed in claim 7, wherein the second section of the external toothing arrangement is also turned in the same chucking operation.

9. The method as claimed in claim 8, wherein the force required for the axial pressing is applied by a nut, fixed axially on the shaft, being screwed onto the hub.

* * * * *